US007004365B2

(12) United States Patent
Ingram

(10) Patent No.: US 7,004,365 B2
(45) Date of Patent: Feb. 28, 2006

(54) TRANSPORT CAGE WITH ENCLOSED CASE

(76) Inventor: Joseph T. Ingram, 273 Brethren Rd., Beckley, WV (US) 25801

( * ) Notice: Subject to any disclaimer, the term of this patent is extended or adjusted under 35 U.S.C. 154(b) by 331 days.

(21) Appl. No.: 10/441,019

(22) Filed: May 20, 2003

(65) Prior Publication Data

US 2004/0232182 A1 Nov. 25, 2004

(51) Int. Cl.
*B60R 7/00* (2006.01)

(52) U.S. Cl. ...................... 224/401; 224/404; 224/328; 224/566; 224/527; 220/23.91

(58) Field of Classification Search ................ 224/401, 224/403–405, 328, 319, 309, 566, 527, 314, 224/42.33, 42.34; 220/485, 23.91, 23.87, 220/730, 668
See application file for complete search history.

(56) References Cited

U.S. PATENT DOCUMENTS

| | | | | | |
|---|---|---|---|---|---|
| 2,287,531 | A | * | 6/1942 | Ong | 224/448 |
| 3,698,360 | A | | 10/1972 | Rubricius | |
| 3,731,657 | A | | 5/1973 | Alessio | |
| 5,010,848 | A | | 4/1991 | Rankin | |
| 5,050,867 | A | | 9/1991 | Rand et al. | |
| 5,106,002 | A | * | 4/1992 | Smith et al. | 224/506 |
| 5,335,468 | A | | 8/1994 | Oberman et al. | |
| 5,520,314 | A | * | 5/1996 | Tkachuk | 224/405 |
| 5,573,162 | A | * | 11/1996 | Spencer et al. | 224/401 |
| 5,808,866 | A | | 9/1998 | Porter | |
| 5,819,933 | A | * | 10/1998 | Hernandez | 220/485 |
| 5,960,744 | A | | 10/1999 | Rutman | |
| 6,077,007 | A | * | 6/2000 | Porter et al. | 410/140 |
| 6,145,719 | A | | 11/2000 | Robert | |
| 6,209,941 | B1 | * | 4/2001 | Cross | 296/37.1 |
| 6,378,748 | B1 | * | 4/2002 | Cox | 224/511 |
| 6,425,508 | B1 | | 7/2002 | Cole et al. | |
| 6,582,169 | B1 | * | 6/2003 | Cano-Rodriguez et al. | 410/128 |
| 6,607,228 | B1 | * | 8/2003 | Carter et al. | 296/10 |
| 2002/0005389 | A1 | | 1/2002 | Guo | |

FOREIGN PATENT DOCUMENTS

| | | |
|---|---|---|
| DE | 19535921 | 11/1996 |

* cited by examiner

*Primary Examiner*—T. Mai
(74) *Attorney, Agent, or Firm*—Richard C. Litman

(57) ABSTRACT

A transport cage ("cage") and enclosed case combination, wherein the cage is adapted to attach to a vehicle rack where the cage functions simultaneously as a transport container and as a supplemental rack. The cage comprises a first and second tubular framework respectively defining an open box ("box") and a lid. The lid can move between an open and closed position with respect to the box. In the preferred embodiment the cage is designed to accommodate a rifle case. At least one connector enables the cage to be connected to a vehicle rack. The first or second tubular framework enable additional items to be attached to the cage such that the cage acts as a supplemental rack. The cage and case combination is particularly suited to carrying additional items on an ATV rack thereby extending the carrying capacity of an ATV rack.

13 Claims, 8 Drawing Sheets

TRANSPORT CAGE WITH ENCLOSED CASE

BACKGROUND OF THE INVENTION

1. Field of the Invention

The present invention relates to an apparatus for transporting delicate or expensive items on a vehicle. More specifically, the invention is directed to a transport cage and enclosed case combination to carry items such as a hunting rifle on an all terrain vehicle ("ATV").

2. Description of the Related Art

All terrain vehicles ("ATVs") are frequently used on rough terrain and off-road by outdoors men and women such as deer hunters, outdoor enthusiasts, professional explorers (e.g, field geologists and gemstone hunters), national park employees, farmers, and cattle herders. ATV vehicles are often used to carry expensive items such as cameras, hunting rifles and/or parts thereof, hunting bows and arrows, binoculars, and professional equipment used by e.g. field geologists. Other items carried outdoors on ATVs include drugs and medicines such as anti-snake venom for use by a medical professional or wild-life vet; a park warden may carry animal knock-out darts and knock out drug refills on their ATV. Thus, expensive and/or delicate items are often carried on ATVs both for enjoyment and professional use.

Hunting rifles, bows, binoculars (and other optical devices such as sighting telescopes), and cameras are easily damaged by sudden sharp movements and for this reason are often regarded as knock-sensitive items. Gemstones such as emerald are very sensitive to knocks; likewise for alexandrite. Some medicines and explosives are also sensitive to knocks. Thus, there is a need for an apparatus or device to carry knock-sensitive items on an ATV.

ATVs typically have at least one external rack, e.g., a front and rear external racks for attaching items such as a killed animal, e.g. a fresh deer carcass, and hunting equipment such as a hunter's tree stand. Knock sensitive items that need to be carried on the racks have to compete with, for example, the hunter's tree stand. Knock sensitive items may be attached to an ATV rack. When the ATV is driven over rough ground knocks and bumps are inevitably transmitted to the knock-sensitive items carried on the ATV's racks. Specifically, there is a need for a transport apparatus or device that protects knock-sensitive items such as guns, cameras, and medicines attached to ATV racks.

In some states the law requires gun owners, including hunters, to transport firearms in a case. This law sometimes raises serious practical issues for hunters who e.g. attache a tree stand and a fresh kill such as a deer carcass respectively to the front and rear ATV racks. If the ATV racks are otherwise stacked with equipment and/or a fresh kill it is sometimes very hard for the hunter to put their hunting rifle in a case and attach the case to one of the heavily occupied ATV racks. Some hunters are tempted to carry their rifle on their shoulder perhaps because a tree stand and a dead deer are respectively attached to the ATV's front and rear racks. Driving an ATV in rough terrain with a high power rifle on the driver's shoulder is clearly unsafe and possibly illegal. Thus, there is a need for a device that enables a hunter to carry a gun in a case attached to an ATV rack that does not substantially compromise the carrying capacity of the ATV rack, i.e. the ATV rack should still be able to carry other items such as a deer or a hunter's tree stand.

Several efforts have been made to address these problems. U.S. Pat. No. 6,145,719 issued Nov. 14, 2000 to L. J. Robert describes a vehicle mountable gun and equipment case for the safe transportation of guns and equipment. The '719 case can be attached to an ATV's rack. Once attached to the ATV's rack the '719 device takes up space on the rack and thereby diminishes the racks capacity to carry other items.

U.S. Pat. No. 5,050,867 issued Sep. 24, 1991 to Rand et al., describes a portable cage-like protective apparatus for surrounding athletic field equipment such as pad assemblies for high jump and pole vault landing pits. The '867 apparatus protects against mischievous damage to pad assemblies, making it unnecessary to daily disassemble and move the pad assemblies or other athletic field equipment. The '867 patent does not teach or suggest a cage-like apparatus adapted to deal with the particular problems associated with attaching items to ATV racks.

U.S. Pat. No. 6,425,508 issued Jul. 30, 2002 to Cole et al. describes a sports equipment rack for a vehicle. Whatever the merits of the '508 patent there is no teaching or suggestion of a device to protect knock sensitive items carried on an ATV's racks. In addition, the '508 patent does not teach or suggest a means for safely carrying knock sensitive items which does not substantially diminish the load carrying capacity of a vehicle's rack.

Other patents showing portable cage-like protective devices, but which do not suggest or teach the subject matter of the present claimed invention, include U.S. Pat. Nos. 3,698,360, 3,731,657, 5,010,848, 5,335,468, 5,808,866, and 5,960,744.

Foreign patents showing portable cage-like protective devices, but which do not suggest or teach the subject matter of the present claimed invention, include DE 19535921.

None of the above inventions and patents, taken either singly or in combination, is seen to describe the instant invention as claimed. Thus, a portable cage with enclosed case solving the aforementioned problems is desired.

SUMMARY OF THE INVENTION

A transport cage ("cage") and enclosed case combination, wherein the cage is adapted to attach to a vehicle rack where the cage functions simultaneously as a transport container and as a supplemental rack. The cage comprises a first and second tubular framework respectively defining an open box ("box") and a lid. The lid can move between an open and closed position with respect to the box. In the preferred embodiment the cage is designed to accommodate a rifle case. At least one connector enables the cage to be connected to a vehicle rack. The first or second tubular framework enable additional items to be attached to the cage such that the cage acts as a supplemental rack. The cage and case combination is particularly suited to carrying additional items on an ATV rack thereby extending the carrying capacity of an ATV rack.

Accordingly, it is an object of the invention to provide an apparatus for transporting delicate or expensive items such as a hunting rifle on a vehicle.

It is a further object of the invention to provide a transport cage and enclosed case combination, wherein the cage is adapted to securely attach to a vehicle rack.

It is another object of the invention to provide a transport cage adapted to act as a supplemental or additional rack.

It is yet another object of the invention to provide a transport cage that enables a hunter to carry a gun in a case attached to an ATV rack without substantially compromising the carrying capacity of the ATV rack.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention relates to an apparatus for transporting delicate or expensive items on a vehicle. More specifically, the invention is directed to an apparatus that is adapted to securely and safely carry items on an all terrain vehicle ("ATV") such as camera parts, binoculars, or a hunter's rifle, bow, and/or parts thereof. The terms "transport cage" and "cage" are hereinafter regarded as equivalent terms.

Figure 1:
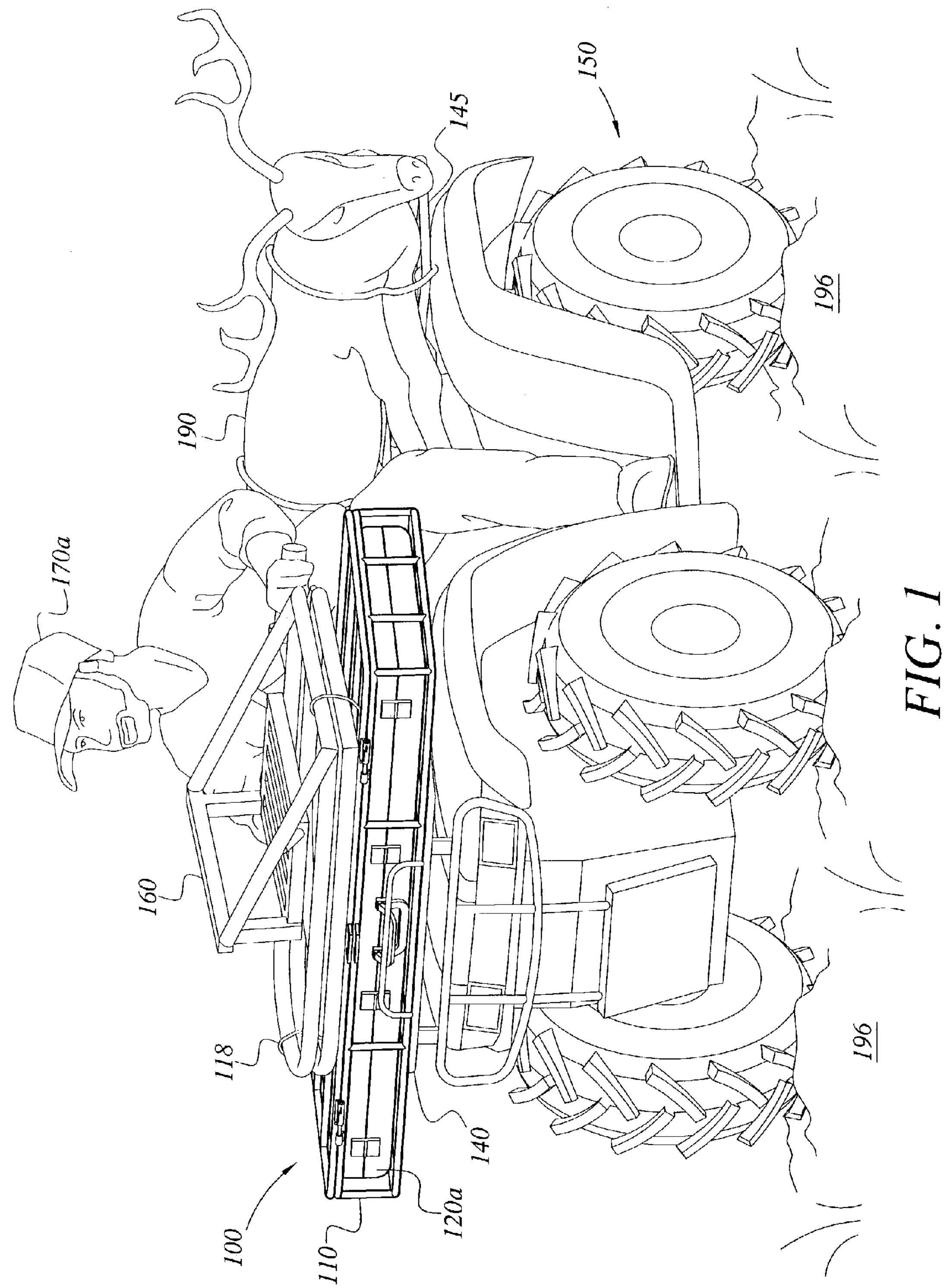
FIG. 1 is an environmental perspective view of the transport cage with enclosed case attached to an ATV rack according to one embodiment of the present invention.
Figure 2:
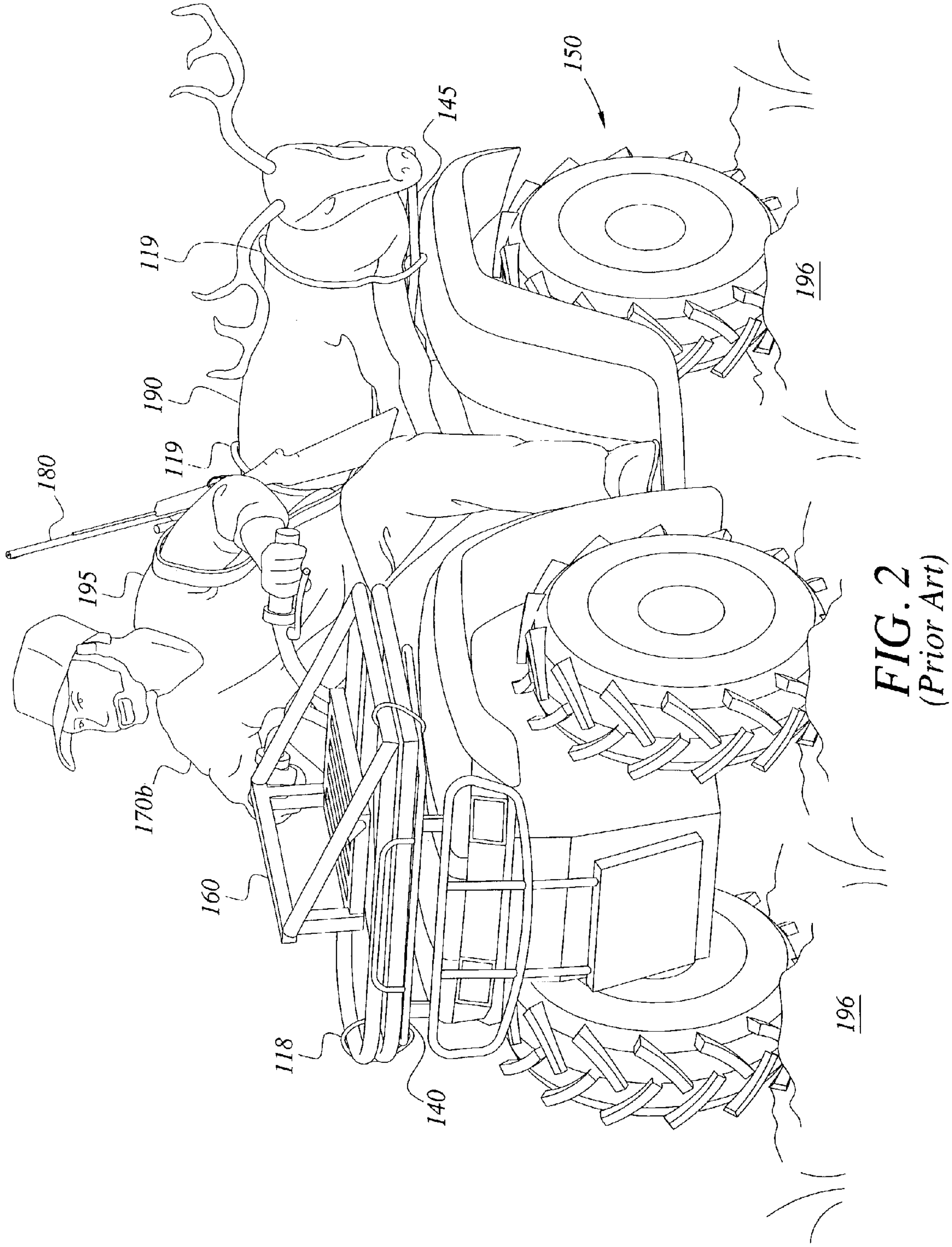
FIG. 2 is a prior art perspective view of a deer hunter driving an ATV while improperly carrying a rifle due to lack of storage capacity on ATV's racks.

Referring generally to the figures and FIG. 1 in particular, the transport cage and enclosed case combination is denoted generally by the reference numeral 100. In a preferred embodiment, the transport cage and enclosed case combination 100 comprises a cage 110 adapted to accommodate a case such as a rifle carrying case 120*a*. The rifle case 120*a* is adapted to carry a hunter's firearm such as a high power deer rifle 180 (see FIG. 5A). At least one connector 130 (e.g., see FIGS. 3 and 3A) is used to attache the cage 110, and the case 120*a* therein, to a first or second rack on an all terrain vehicle ("ATV") 150 as shown in FIG. 1; the first and second racks are shown respectively as the front 140 and rear 145 ATV racks. The prior art racks 140 and 145 typically comprise a tubular framework as shown in FIGS. 1 and 2. When the racks 140 and 145 host the cage and supplemental rack 110 of the present invention the racks 140 and 145 may be regarded separately as host racks.

The cage 110 functions as a supplemental rack when the cage 110 is connected to the all terrain vehicle rack 140 or 145 thereby allowing additional hunting accessories such as a tree-stand 160 to be attached to the cage 110 and hence to the all terrain vehicle 150 as shown in FIG. 1. More specifically, the cage 110 comprises a first 115*a* and second 115*b* tubular frameworks (see FIG. 4) which separately, or in combination, mimic the functionality of the front 140 or rear rack 145. Thus, items such as a tree stand 160 can be attached to the cage 110 using, for example, one or more elastic hooks 118 as shown in FIG. 1. More specifically, the tree stand 160 can be attached to either the first 115*a* and/or second 115*b* tubular frameworks.

It should be understood that any suitable attachment device can be used to attach objects to the cage 110. For example, one or more elastic hooks 118 and/or lengths of rope 119 can be used to attach a deer carcass 190 to any part of the cage 110. Thus, the cage 110 is adapted to accommodate a case 120 (such as a rifle case 120*a*) and function as a supplemental rack mimicking the functionality of the front 140 or rear 145 racks mounted on an ATV 150.

A deer hunter 170 typically carries a tree-stand 160 and a deer carcass 190 attached to the front 140 and rear 145 ATV racks. The tree stand 160 is used by the hunter 170 to climb and sit in a tree (not shown) from which vantage point the hunter 170 would shoot (by bow or gun) a passing deer (not shown) to provide a deer carcass 190. The hunter 170 carried the deer carcass 190 to his ATV 150 and tied it to one of the ATV racks, e.g. rack 145. The hunter 170 tied the tree-stand 160 to the other rack, e.g. rack 140. This left the hunter 170 in a quandary, "Where to put the deer rifle 180?".

Prior to the cage and case combination 100 of the present invention, a hunter 170*b* could be tempted, as shown in FIG. 2, to inappropriately carry a rifle 180 slung across the hunter's shoulder 195. Such temptations can be manifested in the mind of the hunter 170*b* because of a shortage of carrying space on the ATV 150 generated when a tree stand 160 and dead deer 190 are attached to the ATV's front 140 and rear 145 racks. With the racks 140 and 150 in use the hunter 170*b* often resorted to carrying a rifle 180 slung across the hunter's shoulder 195 as shown in FIG. 2.

It is inherently unsafe for the hunter 170*b* to drive an ATV 150 across rough ground 196 with a high power rifle 180 slung across the hunter's shoulder 195. The hunter 170*b* may forget to fully unload the rifle 180 of ammunition thereby rendering the rifle liable to accidental discharge particularly if the ATV 150 hits an obstruction that causes the rifle 180 to slip off the hunter's shoulder 195 and collide with a part of the ATV 150. In addition, in many jurisdictions it is illegal to transport firearms in such an insecure manner as shown in FIG. 2.

The present invention solves this problem (see FIG. 1) because the cage 110 stores the case 120*a* and acts as a supplemental rack when attached to either of the ATV racks 140 and 145. The hunter's rifle 180 is securely stored in the case 120*a* (see, e.g., FIG. 5B) which is carried inside the cage 110 and, for example, a tree stand 160 attached to the cage 110. Thus, the present invention 100 allows a deer hunter 170*a* to safely drive an ATV 150 with a rifle 180 (stored securely in the case 120), and a tree stand 160 or deer carcass 190 attached to the cage 110 as shown in FIG. 1. More specifically, items can be attached to either tubular frameworks 115*a* and/or 115*b* using e.g. elastic hooks 118 and/or ropes 119.

Figure 3:
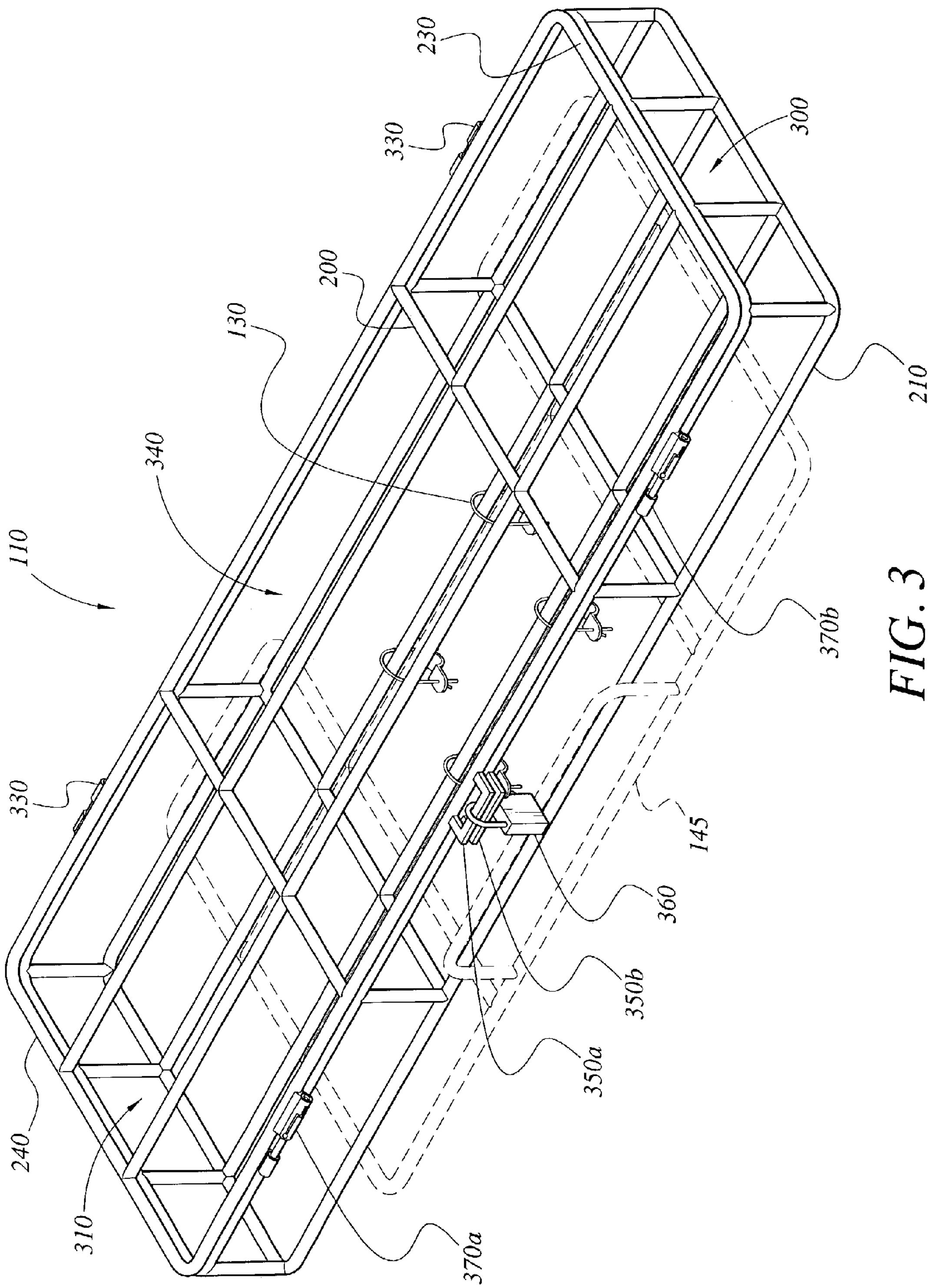
FIG. 3 is a perspective view of a transport cage with enclosed case according to the present invention.
Figure 4:
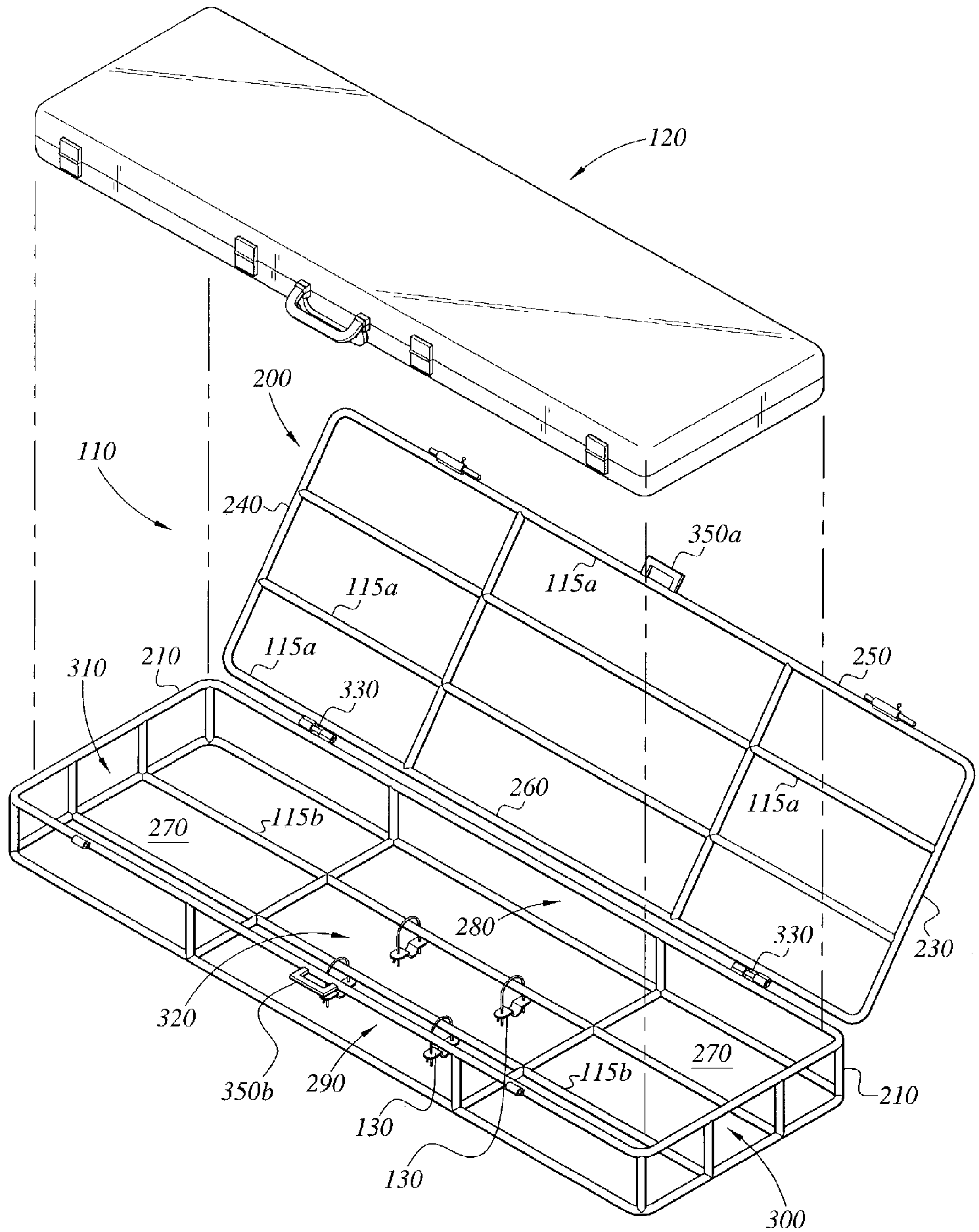
FIG. 4 is an exploded view of a transport cage and case combination according to one embodiment of the present invention.

Referring to FIGS. 3 and 4, the cage structure 110 comprises a lid 200 attached to a generally rectangular open box 210. The lid 200 and box 210 respectively comprise of a first tubular framework 115*a* and a second tubular framework 115*b*. The tubular framework 115*a* comprises opposite ends 230 and 240, and lateral sides 250 and 260. The tubular framework 115*b* defines a box base 270, opposite lateral box sides 280 and 290, and opposite box ends 300 and 310; collectively, the base 270, opposite lateral sides 280 and 290, and opposite ends 300 and 310 define an opening 320 to the box 210. The opposite ends 230 and 240 of the lid 200 are respectively proximate to the opposite ends 300 and 310 of the box 210; likewise the lateral sides 250 and 260 of the lid 200 are respectively proximate to the lateral sides 280 and 290 of the box 210.

It will be immediately understood that since the lid 200 and box 210 respectively comprise a first 115*a* and second 115*b* tubular frameworks an ATV driver could pass a hand, or part thereof such as a finger, between the tubular members that make up the first 115*a* and second 115*b* tubular frameworks. However, the sides 250, 260, 280, and/or 290 may separately or in combination optionally take the form of a solid surface so long as the cage 110 can still function as a supplemental rack with sufficient gaps in at least some of the sides thereof to permit, for example, an elastic hook 118 to hook on at least one part of the cage 110.

It should be understood that while the preferred overall shape of the box 210 is that of an elongated generally rectangular open box, the box 210 may adopt any suitable shape such as an open square box, a circular shape, or even an irregular shaped open box. The lid 200 can be any shape that broadly complements the shape of the opening 320 in the box 210. The case 120 can also be any shape providing the case 120 is able to fit inside the box 110. For example, the box 210 may adopt shapes such as an oval, heart, trapezoidal, rhombus, or square shape. The box 210 may vary in size according to the type of item or items that the user desires to carry in the case 120; for example, a gem explorer would require a small case 120 and hence box 210 and accompanying lid 200.

Still referring to FIGS. 3 and 4, the lid 200 is movable between an open and closed position with respect to the box 210, wherein the lid 200 and box 210 are hinged to each other at proximate lateral sides 260 and 280 by at least one hinge member 330. In the closed configuration, as shown in FIG. 3, the cage 110 defines a cage interior 340. The cage 110 is opened to provide access to the cage interior 340 as shown in FIG. 4; the interior 340 is sized to accommodate the case 120.

The first 115*a* and second 115*b* tubular frameworks are preferably made of tubes of high strength corrosion resistant lightweight material with, for example, a circular cross sectional area (e.g., tubes of treated steel such as chromed steel, zinc coated (galvanized) steel, and stainless steel alone or in combination); alternatively, cheaper metal such as tubes of aluminum may be used. Plastic coated metal or plastic coated metal alloy may also be used though the plastic coating should demonstrate at least some resistance to chipping. Tubular aluminum is preferred on grounds of low cost while offering an excellent combination of strength and lightness. While circular cross section tubes are preferred, any suitable configuration may be used, e.g. hollow square or rectangular steel tube sections. Other high strength tubing include molybdenum tubing which offers very high strength and resistance to corrosion. Alternatively, the tubes 115*a* and 115*b* can be made of a resilient polymer for lightness, strength, and resistance to weathering.

The first 115*a* and second 115*b* tubular frameworks are preferably about the same or less than the width as the tubular framework of the racks 140 and 145. Thus, elastic hooks or other attachment devices that are used to secure items to the tubular framework of the racks 140 and 145 will also secure items to the first 115*a* and second 115*b* tubular frameworks that make up the cage 110.

Still referring to FIGS. 3 and 4, a pair of lock brackets 350*a* and 350*b* are respectively attached at complementary aligned positions on proximate sides 250 and 290 of the cage 110. More specifically, the lid 200 and box 210 are locked to each other by a pair of aligned lock brackets 350*a* and 350*b* respectively attached to proximate lateral sides 250 and 290 as shown in FIGS. 3 and 4. Any suitable locking device, such as padlock 360, may be threaded through the brackets 350*a* and 350*b* to keep the cage lid 200 in the closed position with respect to the cage box 210. Alternatively, latches 370*a* and 370*b* are used to keep the lid 200 in a closed position.

Figure 3A:
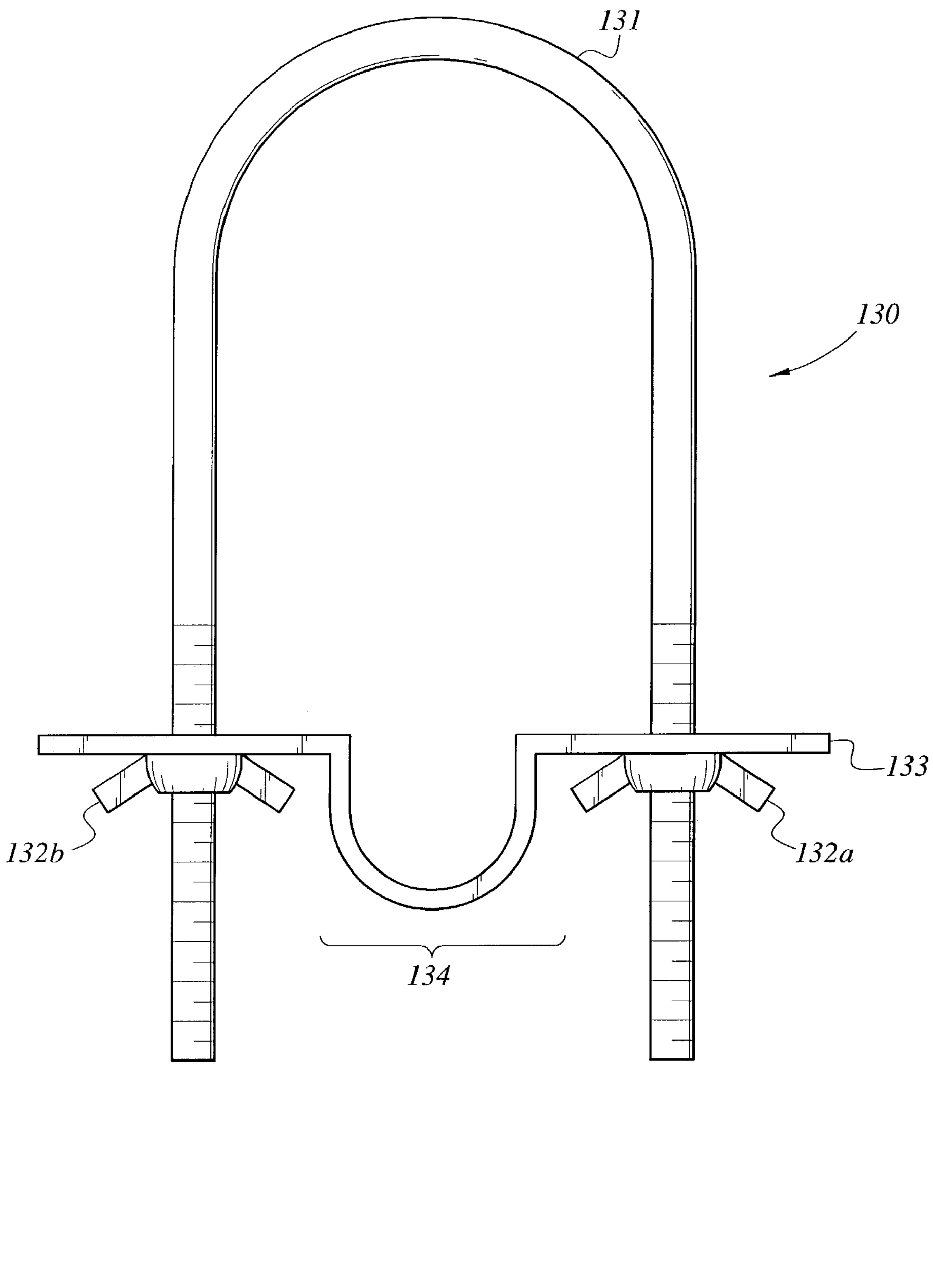
FIG. 3A is a side view of at least one connector adapted to connect a transport cage to a vehicle's rack according to the present invention.

At least one connector 130 is used to attach the base 270 to, for example, the rear ATV rack 145. Any type of suitable connector may be used, a preferred form of the at least one connector 130 is shown in FIG. 3A. The preferred form comprises a U-bracket 131, a pair of wing nuts 132*a* and 132*b* and a securing bracket 133. The securing bracket 133 comprises a concave section 134 shaped to fit to the tubular framework of, for example, the front ATV rack 140

When the case 120 is stored in the case interior 230, the connectors 130 are rendered substantially inaccessible to e.g. an opportunistic thief (now shown). Items such as a tree stand 160 may be attached to the tubular frame 115*a* that defines the lid 200 thus illustrating the supplemental rack functionality of the cage 110. It should be understood that orientation of the cage 110 can vary, e.g., the lid 200 may be attached to the front rack 140 items attached to the framework 115*b* that defines the box member 210 of the cage 11C.

Figure 5A:
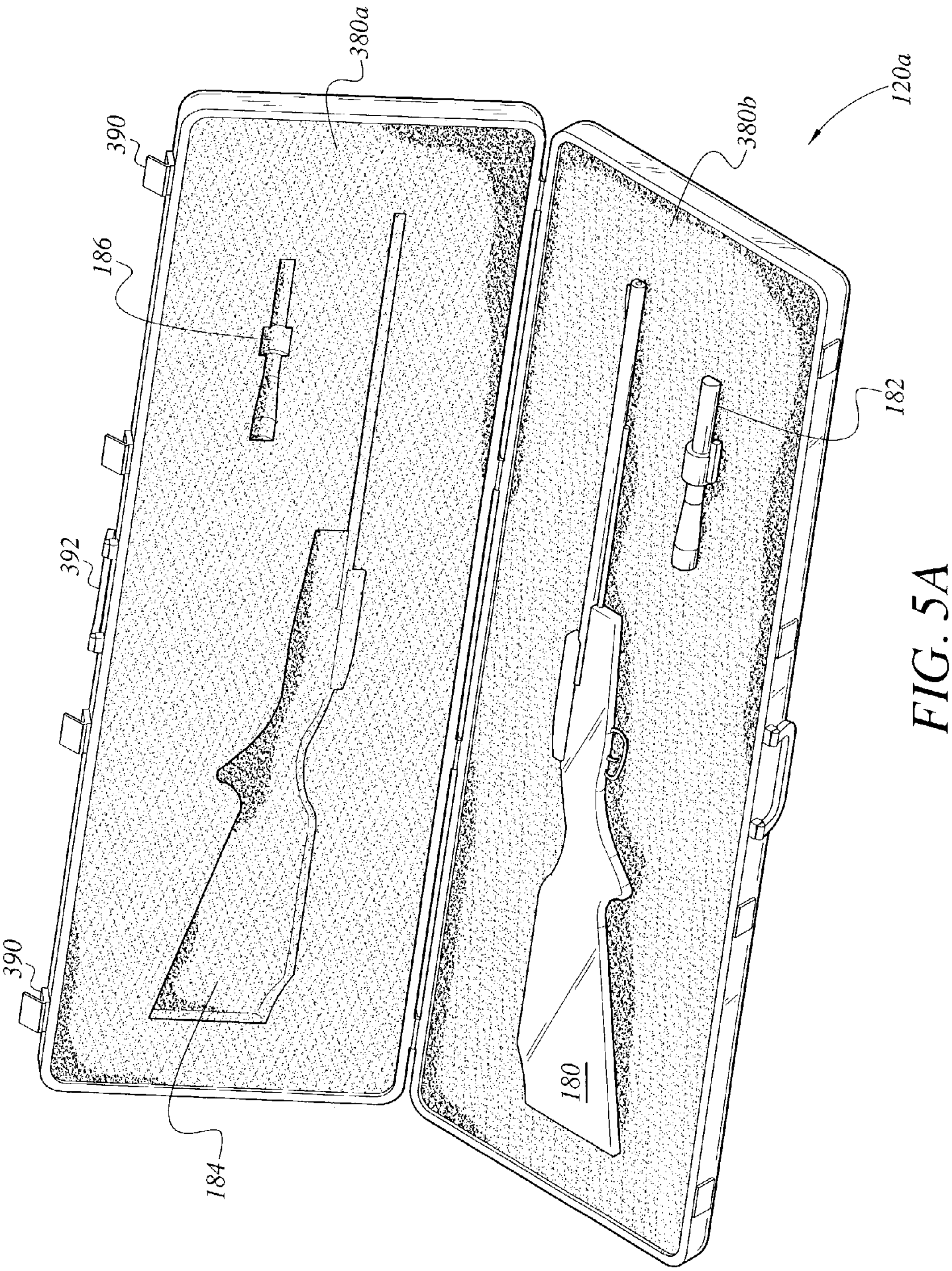
FIG. 5A is a perspective view of a case with inserts and molded cut-outs therein according to the present invention.

FIG. 5A shows a rifle carrying case 120*a*. The case 120*a* comprises a pair of foam inserts 380*a* and 380*b*. The inserts 260*a* and 260*b* are adapted to accommodate a rifle 180 and associated gun scope 182. Specifically, each insert 380*a* and 380*b* have cut-outs shaped to accommodate the parts of the rifle 180; some of the cut-outs (184 and 186) are visible in insert 380*a*. When the case 120*a* is closed the inserts 380*a* and 380*b* keep items stored in the case 120*a* securely in place. The inserts 380*a* and 380*b* are preferably made of a material that absorbs mechanical shocks thus buffering items stored in the case 120*a* from knock damage otherwise possible when the ATV 150 is driven off-road and across rough terrain 196 (see FIG. 1).

It should be understood that the case 120*a* may comprise of inserts adapted to securely hold other items such as binoculars, camera parts, gems, drugs and medicines such as anti-snake venom. It should also be understood that the cut-outs can be of any suitable shape to accommodate a range of knock-sensitive items such as gemstones (e.g. emerald and alexandrite); for example, a gemstone hunter conducting exploration in the field on an ATV may require cut-outs in the form of a range of shapes and sizes to accommodate delicate gemstones.

Figure 5B:
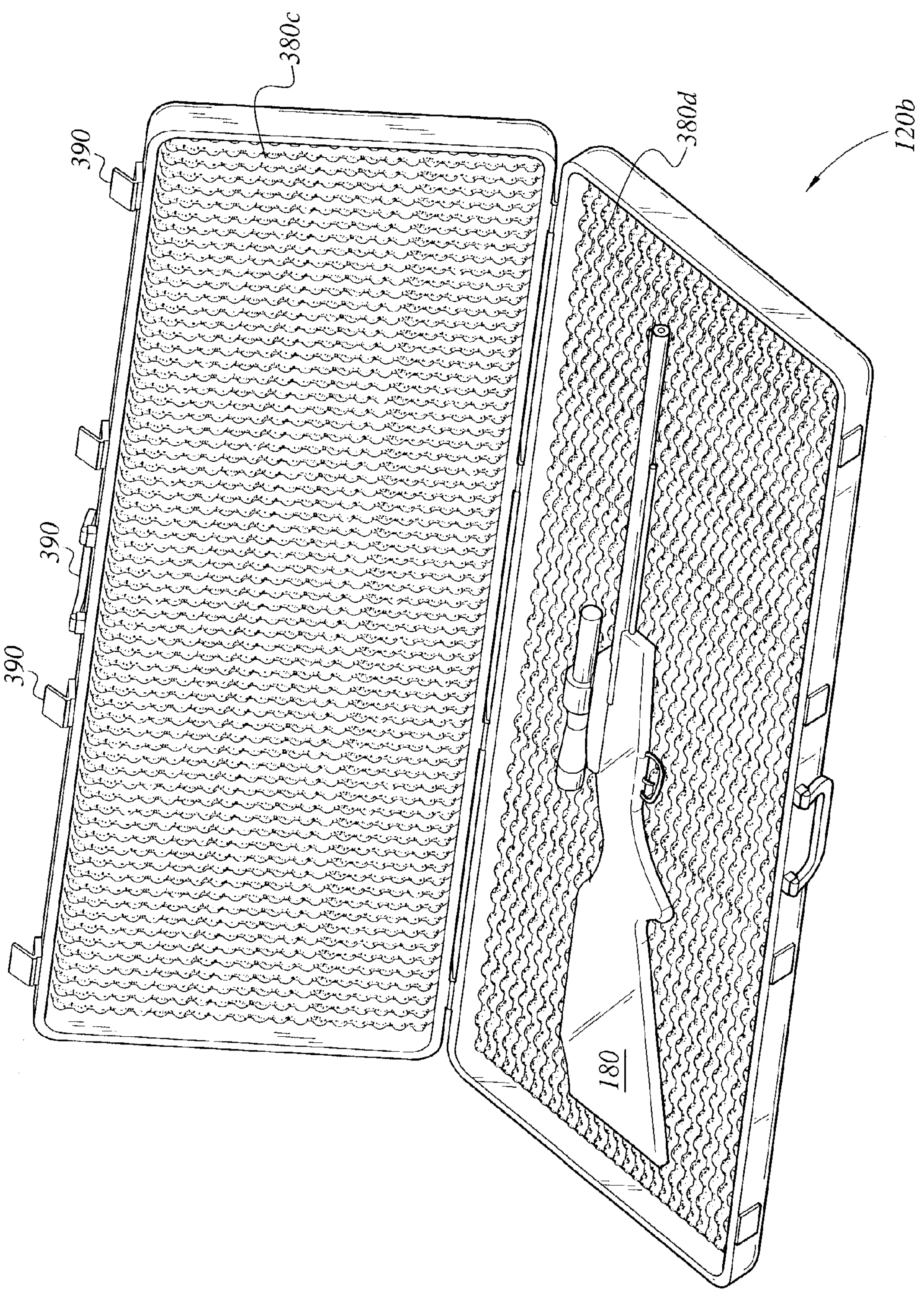
FIG. 5B is a perspective view of a case with inserts absent molded cut-outs therein according to the present invention.

FIG. 5B shows a case 120*b* that comprises a pair of inserts 380*c* and 380*d*. The inserts 380*c* and 380*d* are made of a material that deforms easily. Thus, when the case 120*b* is closed, the inserts 380*c* and 380*d* deform slightly around the items stored in the case 120*b* thus protecting the stored items from mechanical shocks. The inserts 380*c* and 380*d* are particularly suitable for protecting unusual or irregularly shaped objects from mechanical shocks such as gemstones and meteorites (meteorite hunters sometimes used ATVs to look for fallen meteors which are highly valued by meteorite collectors and geological museums. The case 120*b* (likewise cases 120 and 120*a*) may comprise optional latches 390 and case handle 392.

Figure 6:
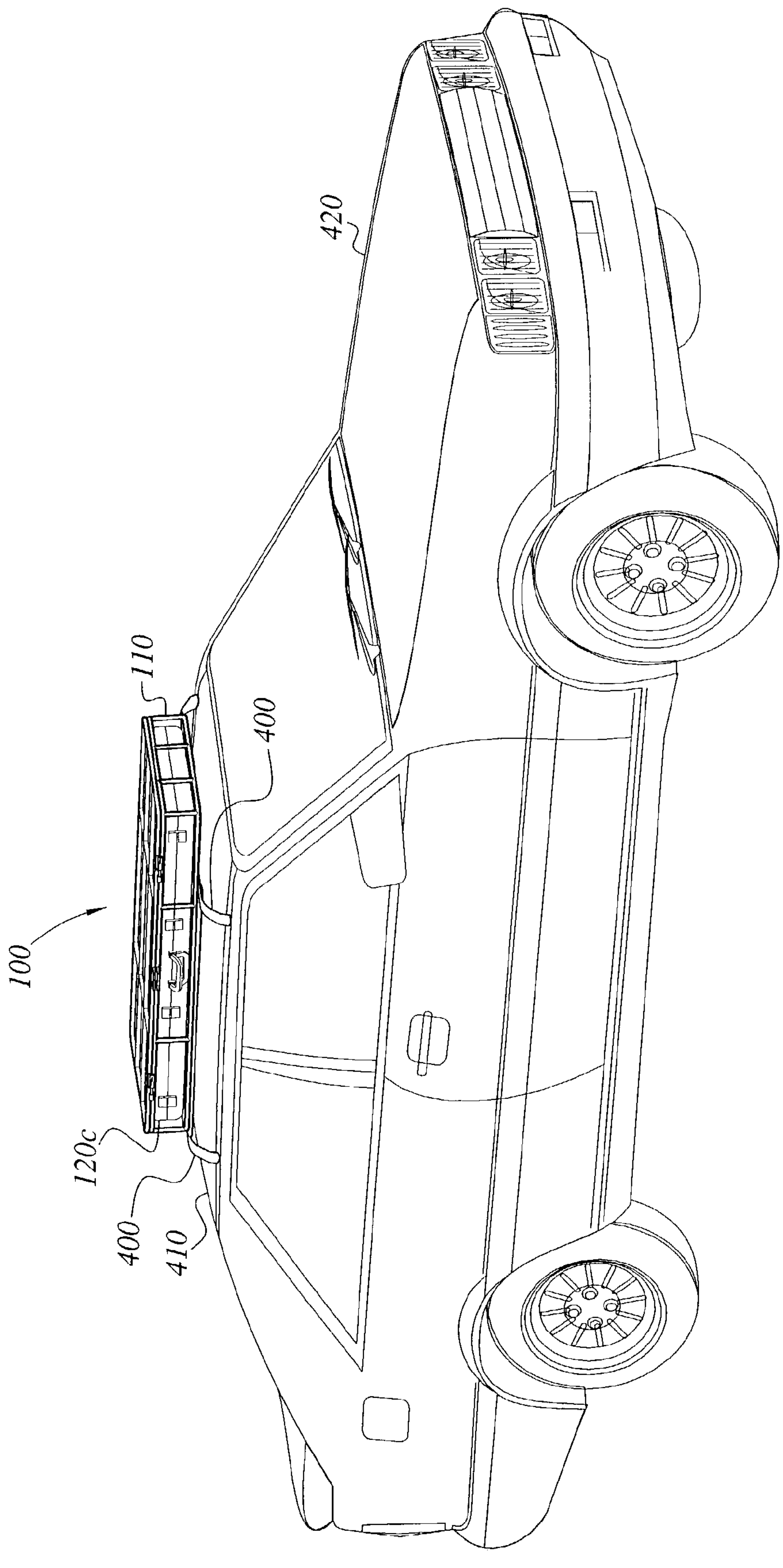
FIG. 6 is a perspective view of a cage attached to a roof rack on a family car according to the present invention.

FIG. 6 shows the transport cage and enclosed case combination 100 of the present invention can be fitted to racks attached to non-ATV vehicles such as a rack 400 attached to the roof 410 of a family car 420. Though not shown, additional items could be attached to the cage 110 by means of e.g. elastic hooks 118, thus demonstrating the versatility of the cage 110 and its ability to function as a supplemental rack without substantially diminishing the carrying capacity of the host rack 400.

It is to be understood that the present invention is not limited to the embodiments described above, but encompasses any and all embodiments within the scope of the following claims.

I claim:

1. A transportation apparatus adapted to carry items therein and function as a supplemental rack for attaching further items thereto, comprising:

a cage having a first tubular framework and a second tubular framework respectively defining an open box and a lid, wherein the lid moves between an open and closed position with respect to the box, wherein when the lid is in a closed position the lid and box collectively define an internal storage space for carrying at least one item therein, and wherein the lid and box collectively define a supplemental rack suitable for attaching other items thereto;

said first tubular framework consisting of first and second ends, first and second lateral sides, said first and second ends and said first and second lateral sides defining a rectangular form, a plurality of first members extending between said first and second ends, and parallel to said lateral sides, a plurality of second members extending between said first and second lateral sides, and parallel to said ends, said first and second members intersecting and forming a grid within said rectangular form;

said second tubular framework consisting of pair of first ends and a pair of second ends, a pair of first lateral sides, and a pair of second lateral sides, said pair of first ends being parallel and vertically spaced apart by a predetermined distance, said pair of second ends being parallel and vertically spaced apart by said predetermined distance, said pair of first lateral sides being parallel and vertically spaced apart by said predetermined distance, said pair of second lateral sides being parallel and vertically spaced apart by said predetermined distance, and a plurality of spacer rods extending periodically and perpendicularly between each pair of first ends, each pair of second ends, each pair of first lateral sides, and each pair of second lateral sides, said spacers defining said predetermined distance; the upper of said pair of first ends, the upper of said pair of second ends, the upper of said pair of first lateral, and the upper of said pair of second lateral sides defining an upper rectangular form, the lower of said pair of first ends, the lower of said pair of second ends, the lower of said pair of first lateral, and the lower of said pair of second lateral sides defining a lower rectangular form, a plurality of first members extending between the lower of said pair of first ends and said pair of second ends, and parallel to the lower of said lateral sides, a plurality of second members extending between the lower of said pair of first lateral sides and the lower of said pair of second lateral sides, and parallel to the lower of said ends, said first and second members intersecting and forming a grid within said lower rectangular form;

wherein said rectangular form of said first tubular framework being hingedly coupled to said upper rectangular form of said second tubular framework;

a pair of lock brackets respectively disposed on each of said first and second tubular framework;

whereby when said first tubular framework is in a closed position, said pair of lock brackets are adjacent and adapted to receive a locking mechanism therebetween; and at least one connector adapted to attach the cage to a vehicle rack, wherein said cage lockingly secures items contained therein and simultaneously provides a capacity for releasably securing a load to the top thereof.

2. The transportation apparatus of claim 1 further comprising a case, wherein the case is sized to fit inside the internal storage space of the cage.

3. The transportation apparatus of claim 1 further comprising a case, wherein the case is sized to fit inside the internal storage space of the cage, wherein the case comprises at least one insert, wherein the at least one insert is made of material able to absorb mechanical shocks and wherein the insert is adapted to secure at least one item inside the case.

4. The transportation apparatus of claim 1 further comprising a case, wherein the case is sized to fit inside the internal storage space of the cage, wherein the case comprises at least one insert, wherein the at least one insert is made of material able to absorb mechanical shocks and wherein the insert is adapted to secure a rifle or parts of a rifle.

5. The transportation apparatus of claim 1 further comprising a case, wherein the case is sized to fit inside the internal storage space of the cage, wherein the case comprises at least one insert, wherein the at least one insert is made of material able to absorb mechanical shocks and wherein the insert is adapted to secure a camera or parts of a camera.

6. The transportation apparatus of claim 1 further comprising a case, wherein the case is sized to fit inside the internal storage space of the cage, wherein the case comprises at least one insert, wherein the at least one insert is made of material able to absorb mechanical shocks and wherein the insert is adapted to secure a pair of binoculars or parts of a pair of binoculars.

7. The transportation apparatus of claim 1 further comprising a case, wherein the case is sized to fit inside the internal storage space of the cage, wherein the case comprises at least one insert, wherein the at least one insert is made of material able to absorb mechanical shocks and wherein the insert is adapted to secure a pair of binoculars or parts of a pair of binoculars, further wherein the first and second tubular frameworks are made of tubes of high strength corrosion resistant material.

8. The transportation apparatus of claim 1 further comprising a case, wherein the case is sized to fit inside the internal storage space of the cage, wherein the case comprises at least one insert, wherein the at least one insert is made of material able to absorb mechanical shocks and wherein the insert is adapted to secure a pair of binoculars or parts of a pair of binoculars, further wherein the first and second tubular frameworks are made of tubes of treated steel selected from the group consisting essentially of chromed steel, zinc coated steel, galvanized steel, stainless steel, and any combination thereof.

9. The transportation apparatus of claim 1 further comprising a case, wherein the case is sized to fit inside the internal storage space of the cage, wherein the case comprises at least one insert, wherein the at least one insert is made of material able to absorb mechanical shocks and wherein the insert is adapted to secure a pair of binoculars or parts of a pair of binoculars, further wherein the first and second tubular frameworks are made of tubes of treated steel selected from the group consisting of: chromed steel, zinc coated (galvanized) steel, and stainless steel.

10. The transportation apparatus of claim 1 further comprising a case, wherein the case is sized to fit inside the internal storage space of the cage, wherein the case comprises at least one insert, wherein the at least one insert is made of material able to absorb mechanical shocks and wherein the insert is adapted to secure a pair of binoculars or parts of a pair of binoculars, further wherein the first and second tubular frameworks are made of tubes of hollow square or rectangular steel tube sections.

11. The transportation apparatus of claim 1 further comprising a case, wherein the case is sized to fit inside the internal storage space of the cage, wherein the case comprises at least one insert, wherein the at least one insert is made of material able to absorb mechanical shocks and wherein the insert is adapted to secure a pair of binoculars or parts of a pair of binoculars, further wherein the first and second tubular frameworks are made of tubes of metal of circular cross-section.

12. The transportation apparatus of claim 1 further comprising a case, wherein the case is sized to fit inside the internal storage space of the cage, wherein the case comprises at least one insert, wherein the at least one insert is made of material able to absorb mechanical shocks and wherein the insert is adapted to secure a pair of binoculars or parts of a pair of binoculars, further wherein the first and second tubular frameworks are made of polymer for lightness, strength, and resistance to weathering.

13. A transportation apparatus for carrying items on a rack attached to an all terrain vehicle rack, comprising:

a cage having a first tubular framework and a second tubular framework respectively defining an open box and a lid, wherein the lid moves between an open and closed position with respect to the box, wherein when the lid is in a closed position the lid and box collectively define an internal storage space for carrying at least one item therein, and wherein the lid and box collectively define a supplemental rack suitable for attaching other items thereto;

said first tubular framework consisting of first and second ends, first and second lateral sides, said first and second ends and said first and second lateral sides defining a rectangular form, a plurality of first members extending between said first and second ends. and parallel to said lateral sides, a plurality of second members extending between said first and second lateral sides, and parallel to said ends, said first and second members intersecting and forming a grid within said rectangular form;

said second tubular framework consisting of pair of first ends and a pair of second ends, a pair of first lateral sides, and a pair of second lateral sides, said pair of first ends being parallel and vertically spaced apart by a predetermined distance, said pair of second ends being parallel and vertically spaced apart by said predetermined distance, said pair of first lateral sides being parallel and vertically spaced apart by said predetermined distance, said pair of second lateral sides being parallel and vertically spaced apart by said predetermined distance, and a plurality of spacer rods extending periodically and perpendicularly between each pair of first ends, each pair of second ends, each pair of first lateral sides, and each pair of second lateral sides, said spacers defining said predetermined distance; the upper of said pair of first ends, the upper of said pair of second ends, the upper of said pair of first lateral, and the upper of said pair of second lateral sides defining an upper rectangular form, the lower of said pair of first ends, the lower of said pair of second ends, the lower of said pair of first lateral, and the lower of said pair of second lateral sides defining a lower rectangular form, a plurality of first members extending between the lower of said pair of first ends and said pair of second ends, and parallel to the lower of said lateral sides, a plurality of second members extending between the lower of said pair of first lateral sides and the lower of said pair of second lateral sides, and parallel to the lower of said ends, said first and second members intersecting and forming a grid within said lower rectangular form;

wherein said rectangular form of said first tubular framework being hingedly coupled to said upper rectangular form of said second tubular framework;

a pair of lock brackets respectively disposed on each of said first and second tubular framework;

whereby when said first tubular framework is in a closed position, said pair of lock brackets are adjacent and adapted to receive a locking mechanism therebetween;

at least one connector adapted to attach the cage to a vehicle rack; and a case, wherein the case is sized to fit inside the internal storage space of the cage, wherein the case comprises at least one insert, wherein the at least one insert is made of material able to absorb mechanical shocks and wherein the insert is adapted to secure a hunting rifle or parts of a hunting rifle, wherein said cage lockingly secures items contained therein and simultaneously provides a capacity for releasably securing a load to the top thereof.

* * * * *